(12) United States Patent
Laine et al.

(10) Patent No.: US 12,515,533 B2
(45) Date of Patent: Jan. 6, 2026

(54) VEHICLE AND A METHOD OF CONTROLLING THE PROPULSION OF A VEHICLE

(71) Applicant: VOLVO TRUCK CORPORATION, Gothenburg (SE)

(72) Inventors: Leo Laine, Härryda (SE); Johan Lindberg, Gothenburg (SE); Jan Zachrisson, Onsala (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 224 days.

(21) Appl. No.: 18/259,496

(22) PCT Filed: Feb. 9, 2021

(86) PCT No.: PCT/EP2021/053049
§ 371 (c)(1),
(2) Date: Jun. 27, 2023

(87) PCT Pub. No.: WO2022/144094
PCT Pub. Date: Jul. 7, 2022

(65) Prior Publication Data
US 2024/0317069 A1 Sep. 26, 2024

(30) Foreign Application Priority Data
Dec. 29, 2020 (WO) ................ PCT/EP2020/087991

(51) Int. Cl.
*B60L 15/20* (2006.01)
*B60K 1/02* (2006.01)
*B60L 3/10* (2006.01)

(52) U.S. Cl.
CPC ................ *B60L 15/20* (2013.01); *B60K 1/02* (2013.01); *B60L 3/10* (2013.01); *B60L 2240/24* (2013.01); *B60L 2240/423* (2013.01)

(58) Field of Classification Search
CPC ........ B60L 15/20; B60L 3/10; B60L 2240/24; B60L 2240/423; B60L 2200/36;
(Continued)

(56) References Cited

U.S. PATENT DOCUMENTS 7,338,335 B1 3/2008 Messano
2007/0192002 A1* 8/2007 Iyoda ................. B60G 17/0195
701/37

(Continued)

FOREIGN PATENT DOCUMENTS

DE 102016213730 A1 2/2018
DE 102021103820 A1 8/2021
JP 2006240400 A 9/2006

OTHER PUBLICATIONS

English translation of Takayama (JP 2006240400) (Year: 2006).*
(Continued)

*Primary Examiner* — Kyle J Kingsland
(74) *Attorney, Agent, or Firm* — Venable LLP; Jeffri A. Kaminski

(57) ABSTRACT

A vehicle includes a first axle provided with at least a pair of first wheels, and a second axle provided with at least a pair of second wheels. The second axle is a steered axle allowing said second wheels to be turned. At least one first electric machine provides propulsion torque to the first axle. At least one second electric machine provides propulsion torque to the second axle. A control unit is configured to control the first and second electric machines, wherein the control unit is configured to limit the propulsion torque provided by said at least one second electric machine in dependence of a current state of the second axle.

21 Claims, 5 Drawing Sheets

(58) Field of Classification Search
CPC ........... B60L 2240/507; B60L 2260/24; B60L 3/102; B60L 3/106; B60L 15/2054; B60L 15/2072; B60L 15/2036; B60L 2220/42; B60L 2220/46; B60L 2260/28; B60L 2200/42; B60L 2200/46; B60K 1/02; B60W 10/08; B60W 30/18127; B60W 2530/10; B60W 2552/15; B60W 2720/403; Y02T 10/72
See application file for complete search history.

(56) References Cited

U.S. PATENT DOCUMENTS

| | | |
|---|---|---|
| 2015/0251541 A1 | 9/2015 | Drako et al. |
| 2016/0090005 A1 | 3/2016 | Drako |
| 2019/0111927 A1 | 4/2019 | Offerle et al. |
| 2019/0193578 A1 | 6/2019 | Fujiyoshi et al. |
| 2019/0217723 A1 | 7/2019 | Tsukashima |

OTHER PUBLICATIONS

European Communication under Rule 71(3) dated Aug. 30, 2024 in corresponding European Patent Application No. 21704497.3, 40 pages.
International Search Report and Written Opinion in corresponding International Application No. PCT/EP2021/053049 mailed Sep. 22, 2021 (5 pages).
International Preliminary Report on Patentability in corresponding International Application No. PCT/EP2021/053049 mailed Feb. 6, 2023 (8 pages).

* cited by examiner

VEHICLE AND A METHOD OF CONTROLLING THE PROPULSION OF A VEHICLE

CROSS-REFERENCE TO RELATED APPLICATIONS

This application is a U.S. National Stage application of PCT/EP2021/053049, filed Feb. 9, 2021 and published on Jul. 7, 2022, as WO/2022/144094, which claims the benefit of International Patent Application Nos. PCT/EP2020/087991 filed on Dec. 29, 2020, all of which are hereby incorporated by reference in their entireties.

TECHNICAL FIELD

The present disclosure relates to a vehicle, in particular a vehicle propelled by electric machines. The disclosure also relates to a method of controlling the propulsion of a vehicle. Furthermore, the disclosure relates to a computer program, a computer readable medium and a control unit.

The invention can be applied in heavy-duty vehicles, such as trucks, buses and construction equipment. Although the invention will be described with respect to cargo transport vehicles such as semi-trailer vehicles and trucks, the invention is not restricted to this particular vehicle, but may also be used in other vehicles such as cars.

BACKGROUND

In the vehicle industry of today, there is generally much effort put into the development of electric propulsion of the vehicle. A vehicle may, for instance, be provided with an electric motor which drives the propelled wheels via a differential. In such vehicles, the forces can normally not be allocated freely between left and right wheels. However, there are also vehicles in which the wheels are driven by individual electric motors.

DE102016213730 discloses an arrangement where a front axle electric machine is used to provide power in a vehicle high speed range, while a rear axle electric machine is primarily used in the lower speed ranges. The rear axle electric machine is declutched when the vehicle reaches cruising speeds, in order to reduce energy losses. The front axle electric machine and the rear axle electric machine may be used in different driving modes to meet transport efficiency and vehicle safety. The front axle electric machine may, for instance, be used for supporting the rear axle electric machine when needed for improved traction. While this may be beneficial, it may also affect the lifetime of certain vehicle components, such as universal joints, when subjected to high propulsion torque.

It would be desirable to provide a vehicle with the benefits of a rear axle electric machine and a front axle electric machine, but with improved lifetime for some key vehicle components, such as the universal joint.

SUMMARY

An object of the invention is to provide a vehicle and a method which alleviate the drawbacks of the prior art. The object is achieved by a vehicle and a method as defined in the accompanying independent claims.

The present inventive concept is based on the realization that by limiting the maximum torque on a steered axle in dependence of a current state of the steered axle (such as the current steering angle of the wheels of the steered axle, a lateral force or slip generated by tyres of the wheels of the steered axle or a current set height of a height-adjustable connector of the steered axle) the lifetime of key vehicle components, such as driving joints, may be improved. In particular, the torque provided by one or more electric machines to a steered axle should be limited based on said current state of the steered axle.

According to a first aspect of the present disclosure, there is provided a vehicle, comprising:
- a first axle provided with at least a pair of first wheels,
- a second axle provided with at least a pair of second wheels, wherein the second axle is a steered axle allowing said second wheels to be turned,
- at least one first electric machine for providing propulsion torque to the first axle,
- at least one second electric machine for providing propulsion torque to the second axle, and
- a control unit configured to control the first and second electric machines, wherein the control unit is configured to limit the propulsion torque provided by said at least one second electric machine in dependence of a current state of the second axle.

By the provision of a vehicle which comprises a control unit that is configured to limit the propulsion torque in dependence of a current state of the second axle, the wear rate of vehicle components such as driving joints (e.g. universal joints, such as single-centred or double centred) may be effectively reduced. Various factors related to the second axle are known to have effect on the wear rate of vehicle components such as driving joints. One example is the steering angle of the wheels of a steered axle. Another example is the vehicle riding height. Further examples are lateral forces or lateral slips generated by tyres of the wheels of the steered axle.

Thus, according to at least one exemplary embodiment, said current state is a current steering angle of at least one of said second wheels of the second axle.

In other words, at high speeds, when normally only small steering angles are present, the second electric machine may provide a high propulsion torque, while during certain manoeuvres at lower speeds, such as parking, turning around a street corner, etc. the control unit will limit the torque that can be provided by the second electric machine. Suitably, the larger the steering angle, the lower will the torque limit be. However, the relationship between steering angle and maximum allowable torque does not necessarily need to be inverse linear. The control unit may also take other factors into account when setting the torque limit for the second electric machine. An example of such a factor may be the slope of the road, the riding height of the vehicle, lateral tyre forces, lateral tyre slip, etc. For instance, in an uphill turn start, the extra torque available from the second electric machine may be set to a higher limit despite a large steering angle.

From the above it will be understood that the second axle may suitably be configured as a cruise axle, which may mainly be used when the vehicle is cruising along the roads (such as at the vehicle's limiting cruising speed or at a road speed limit). The first axle may be configured as a power/startability axle, which may be suitable for immediate acceleration changes such as hillstart, instant acceleration or deceleration with more regenerative braking, or for steeper uphill cruising than what the cruise axle is designed for. When the vehicle is cruising, the power/startability axle may, for instance, provide extra power, in addition to the cruise axle, when the road changes from planar into an uphill slope.

For a long-haul vehicle, the cruise mode may often take up 95% of the total time the vehicle is used. Therefore, the inventors have realized that when designing a vehicle, in particular the vehicle axles, it is advantageous to first design a cruise axle and its associated electric machine(s) which are able to propel the vehicle in a cruise mode according to specifications. As an example, a cruise mode may be designed for a cruising speed of 85 km/h at a slope of +/−2%. Next, the vehicle needs to be able to handle an upwards slope, say for instance 15%, with a load of, for example, 40 tonnes. The other axle, which may be referred to as a power axle or a startability axle, and its associated electric machine(s), are suitably dimensioned to be able to provide the extra torque needed. As purely illustrative examples, the cruise axle may have a gear ratio of 10:1 and its associated electric machine(s) may be permanent magnet motor(s), while the startability axle may have a gear ratio of 22:1 and its associated electric machine(s) may be an induction motor(s).

It should be understood that first axle may be provided with a single first electric machine configured to propel both/all wheels of the first axle, or there may be provided a first electric machine at either end of the first axle. Thus, both/each wheel of the first axle may be operatively associated with a respective first electric machine. Having two electric machines on one axles provides more freedom of controlling how the wheel torques are split. Similarly, the second axle may be provided with a single second electric machine or a plurality of second electric machines. Thus, from above, it can be understood that the electric machines may either be provided at an axle level (e.g. operating through a differential), or at a wheel level. It should also be understood that in embodiments in which an axle is associated with more than one electric machine it may be possible to select if both electric machines should provide torque at a certain vehicle operating condition, or if only one of the electric machines should provide torque.

For embodiments in which second electric machines are provided at a wheel level, i.e. each second electric machine being associated with a respective wheel, the control unit may take into account the steering angle of the each wheel when setting the torque limit for the associated second electric machine. The steering angles of a left and right wheel may not necessarily be the same, e.g. due to Ackerman steering.

For embodiments in which a second electric machine is provided at an axial level, i.e. the second electric machine providing propulsion torque to both wheels of the second axle, then the control unit may, for instance, set the limit based on the wheel having the largest current steering angle.

The control unit may suitably be configured to receive an input signal representative of the current steering angle. Such an input signal may be transmitted from an angle sensor at a wheel end, such as wheel knuckle angle sensor. Other possibilities are indirect measurements of the steering angle, such as measurements of parameters of a power-assist arrangement, the values of which can be translated to a steering angle values. For instance, the first input signal may be a torque provided by a support motor or a steering gear of the support motor, or it may be a steering gear angle, or it may be a strain measurement signal on push and pull forces at a link rod interconnecting the support motor and the wheel end.

According to at least one exemplary embodiment, the control unit is configured to limit the propulsion torque provided by said at least one second electric machine:

to a lower value when said current steering angle increases, and
to a higher value when said current steering angle decreases.

As mentioned above, the torque limit does not necessarily have an inversely linear dependency to the steering angle. Other factors may be included in calculations and determinations made by the control unit. The dependency may be based on a functional relationship (linear or non-linear), however, it is also conceivable that values of torque limits and steering angle ranges are provided in a lookup table accessible by the control unit.

According to at least one exemplary embodiment, the control unit is configured to increase the torque split ratio between said at least one first electric machine and said at least one second electric machine when said current steering angle increases. Thus, at relatively large steering angles the first electric machine may provide more torque than the second electric machine, while at relatively small steering angles the second electric machine may provide more torque than the first electric machine for propelling the vehicle. In this way, components such as the universal joints are spared from high wearing torques at the steered second axle.

As already mentioned above, the at least one second electric machine may suitably comprise two second electric machines provided at a wheel level. This is reflected in at least one exemplary embodiment, according to which said at least one second electric machine comprises two second electric machines, one at a left end of the second axle and one at a right end of the second axle, wherein the control unit is configured to limit the propulsion torque provided by the second electric machines at the left end in dependence of the current steering angle of the second wheel at the left end of the second axle, and to limit the propulsion torque provided by the second electric machine at the right end in dependence of the current steering angle of the second wheel at the right end of the second axle. This provide more freedom of controlling the wheel torques. For instance, according to at least one exemplary embodiment, when the total torque or the total power needed for maintaining a current operating condition, or for reaching a desired vehicle operating condition, is below a predefined threshold value, then the control unit may be configured to control only one of said two second electric machines to provide a propulsion torque to the second axle, while the other one of said two second electric machines may be controlled not to provide any torque to the second axle. For instance, if the electric machines are designed for a power of approximately 200 kw, and the currently needed power is only 80 kw, then rather than operating both of said second electric machines at 40 kw, it may from an efficiency perspective be advantageous to allocate all power to one of the two electric machines, i.e. one of the electric machines would provide the needed 80 kw to the common axle. Although this may cause a small lateral displacement effect on the vehicle, the positive effect on efficiency may still make this control strategy advantageous. For embodiments having two first electric machines at the first axle, corresponding control strategies may be available.

As mentioned, above the riding height may also be a factor the affects the wear rate of vehicle components. This is reflected in at least one exemplary embodiment, according to which the vehicle further comprise a chassis, wherein the second axle is provided with a height-adjustable connector, such as a damper, operatively connecting the chassis to the second axle for enabling adjustment of the distance between the chassis and the ground, wherein said current state of the second axle is a current set height of the height-adjustable connector of the second axle.

Some long-haul vehicles have adjustable riding height. The driver may lower the chassis when the vehicle is in a cruise mode, in order to lower the drag, and thus improving fuel economy. However, this may have a negative effect on joints at the steered axle, which are then subjected to higher loads when the vehicle is steered. Therefore, it may be desirable to limit the available torque when the chassis has been lowered. This is reflected in the below exemplary embodiment.

According to at least one exemplary embodiment, the control unit is configured to limit the propulsion torque provided by said at least one second electric machine:

to a lower value when said set current height is decreased, and
to a higher value when said current height is increased.

Thus, when the height of the height-adjustable connector of the second axle is reduced, i.e. the riding height is lowered, then the propulsion torque is advantageously limited to spare the joints at the second axle.

As mentioned, above lateral forces or lateral slip generated by tyres of the wheels of the steered axle may also be a factor the affects the wear rate of vehicle components. This is reflected in at least one exemplary embodiment, according to which said current state of the second axle is a measure of how much lateral force that is generated by tyres of said second wheels of the second axle, or said current state of the second axle is a measure of how much lateral slip that is generated by tyres of said second wheels of the second axle.

It is known that longitudinal tyres forces are limited if the lateral slip is high. This is usually referred to as a tyre force ellipse (or tyre friction ellipse), which limits the available lateral and longitudinal tyre forces. Put simply, if the tyre generates a large lateral force, and a large propulsion torque is applied to the wheel provided with the tyre, then because the tyre force ellipse sets a limit to the longitudinal force that the tyre may generate, wheelspin may occur as the force delivered to the tyre tread exceeds that of available tread-to-surface friction, and consequently the tyre loses traction. To avoid this, the torque is suitably limited as reflected in the following exemplary embodiment.

According to at least one exemplary embodiment, the control unit is configured to limit the propulsion torque provided by said at least one second electric machine:

to a lower value when said generated lateral force or lateral slip is increased, and
to a higher value when said generated lateral force lateral slip is decreased.

Thus, when the lateral force and/or lateral slip is increased, the available torque from the second electric machine is suitably reduced to avoid wheelspin form occurring.

According to at least one exemplary embodiment, the first axle is located rearwardly of the second axle as seen in the normal driving direction of the vehicle. Thus, the first axle may suitably be a rear axle or one of several rear axles. One or more of such rear axles may be actuated by electric machines. The second axle may thus be a front axle. However, it should be understood in a vehicle it is not necessarily only the front axle that is a steered axle. In some exemplary embodiments, a rear axle may also be a steered axle associated with one or more electric machines for which a torque limit may be set by the control unit based on a steering angle of a wheel of said rear axle. For instance, in some exemplary embodiments, the second axle may be a steered pusher axle and/or a steered tag axle, which may be lifted from the ground when not in use. Thus, in some exemplary embodiments, the first axle may be provide forwardly of the second axle. Accordingly, it should be understood that the general inventive concept is applicable not only to vehicles having two axles, but also to vehicle having three, four or more axles. Furthermore, although the disclosure focuses on powering two axles, i.e. said first and said second axle, it should be understood that for vehicles having additional axles, such axles may also be provided powered by associated respective electric machines.

According to at least one exemplary embodiment, the first axle is configured as a low speed range axle, and wherein the second axle is configured as a high speed range axle. This is advantageous, since at high speeds, such as at cruising, the steering angles are normally relatively small, while at low speeds, larger steering angles are normally used.

As understood from the above discussions, according to at least one exemplary embodiment the first axle may be configured as a startability axle to be powered when initially accelerating the vehicle, and the second axle may be configured as a cruise axle to be powered when the vehicle is cruising. The cruise axle and the associated electric machine(s) should be dimensioned and configured to maintain the cruise speed by powering the cruise axle enough to uphold the balance against the main road loads, such as rolling resistance, slope resistance and air drag resistance.

According to at least one exemplary embodiment, the first axle has a higher gear ratio than the second axle. By designing the first axle with a higher gear ratio, it may be suitable for use as a startability/power axle. For instance, the first axle may be a rear axle designed with close wheel electric machines (motors) with a fixed gear ratio. This allows the electric machines to apply direct positive and negative wheel torque on both sides. A good gear ratio could, for example, be 20:1-23:1 to keep the electric machines to perform the torque from zero to low speed range, e.g. up to 50-60 km/h. This is, of course, just an example, and it should be understood that other speed ranges are also possible, because the electric machine may have a property that allows high maximum rpm but with poorer electric efficiency for the complete operating speed range or the vehicle. Electric efficiency n is normally defined as the ratio between the output power Pout and the input power Pin. Thus, it is a measure of useable electric power, and the rest being losses.

The second axle may be a steered front axle which may also be installed with close wheel electric machine layout with fixed gear ratio. The second axle may suitably be designed for providing cruising power (i.e. configured as a cruise axle), so the gear ratio may, for instance, be set to 10:1-15:1. High speeds, for instance, up to 90-100 km/h may be provided by the second axle. The control unit may limit the maximum available torque in zero and low speeds where large steer angles can be expected due to low speed manoeuvring and marshalling. This reduces the wear of universal joints used for propulsion. Therefore, a cruise axle according to the present disclosure, which is powered as described herein, may suitably replace standard non-powered steered axles found in vehicles (such as trucks).

Although the first and second axles may suitably have fixed gear ratios, the general inventive concept is not limited to this. For instance, if one of the axles is configured as a startability/power axle it may include two or three gears. This may depend on the particular application and expected use cases, such as for heavy duty construction or mining trucks.

According to at least one exemplary embodiment, the first axle is declutchable, and the second axle is not declutchable. This is particularly advantageous when the vehicle has reached or is closely approaching its cruising speed, since declutching of the first axle avoids such energy losses which would otherwise be caused by unused electric machine resistance. This difference in properties is suitably combined with the previously mentioned difference in gear ratio between the first axle and the second axle.

The control unit may include a microprocessor, microcontroller, programmable digital signal processor or another programmable device. The control unit may also, or instead, include an application specific integrated circuit, a programmable gate array or programmable array logic, a programmable logic device, or a digital signal processor. Where it includes a programmable device such as the microprocessor, microcontroller or programmable digital signal processor mentioned above, the processor may further include computer executable code that controls operation of the programmable device.

The at least one first electric machine and the at least one second electric machine may be of the same type and/or have the same properties, or they may be of different types and/or have different properties. For instance, according to at least one exemplary embodiment, the first electric machine may be configured for handling larger transient torques than the second electric machine. This is advantageous for startability, before steady state has been reached. Furthermore, the first electric machine may suitably be configured such that, when not in use, it provides very little resistance torque to the first axle, or the first axle may suitably be declutchable. According to at least one exemplary embodiment, the second electric machine is dimensioned and configured for powering the second axle when the vehicle is cruising, such as at a predefined cruising speed range and a predefined slope. For instance, a cruising speed range may be 80 km/h-90 km/h at a slope of −2% to +2%, for some vehicles. Of course, it should be understood that these numbers are merely exemplary and the at least one second electric machine may be suitably dimensioned for the requirements of a specific vehicle. According to at least one exemplary embodiment, the second electric machine is configured for powering the second axle at continuous torque, substantially without any transients. This is advantageous when the second axle is configured as a cruise axle. According to at least one exemplary embodiment, the first electric machine may be configured for powering the first axle at hill start, such as providing a transient maximum torque for a relatively short time length, for instance 30 seconds at a slope of 15%. This is advantageous when the first axle is configured as a startability/power axle. According to at least one exemplary embodiment, the first electric machine is an induction motor and/or the second electric machine is a permanent magnet motor. As has been mentioned previously, by making the first axle declutchable, losses may be reduced which would come from the resistance of the first electric machine. However, by using an induction motor as the first electric machine, there are no resistance forces except for inertia of the rotor, and therefore there is no need to declutch the first axle.

According to a second aspect of the present disclosure, there is provided a method of controlling the propulsion of a vehicle, wherein the vehicle comprises:
a first axle provided with at least a pair of first wheels,
a second axle provided with at least a pair of second wheels, wherein the second axle is a steered axle allowing said second wheels to be turned,
at least one first electric machine for providing propulsion torque to the first axle,
at least one second electric machine for providing propulsion torque to the second axle, the method comprising:
limiting the propulsion torque provided by said at least one second electric machine in dependence of a current steering state of the second axle.

The advantages of the method according to the second aspect, including any embodiment thereof, largely correspond to those of the vehicle according to the first aspect, including any embodiment thereof. Some exemplary embodiments of the method are listed below.

According to at least one exemplary embodiment, said current state is a current steering angle of at least one of said second wheels of the second axle.

According to at least one exemplary embodiment, the method comprises limiting the propulsion torque provided by said at least one second electric machine:
to a lower value when said current steering angle increases, and
to a higher value when said current steering angle decreases.

According to at least one exemplary embodiment, the method comprises controlling the torque split ratio between said at least one first electric machine and said at least one second electric machine to increase when said current steering angle increases.

According to at least one exemplary embodiment, said at least one second electric machine comprises two second electric machines, one at a left end of the second axle and one at a right end of the second axle, the method comprising:
limiting the propulsion torque provided by the second electric machines at the left end in dependence of the current steering angle of the second wheel at the left end of the second axle, and
limiting the propulsion torque provided by the second electric machine at the right end in dependence of the current steering angle of the second wheel at the right end of the second axle.

According to at least one exemplary embodiment, the vehicle further comprises a chassis, wherein the second axle is provided with a height adjustable connector, such as a damper, operatively connecting the chassis to the second axle for enabling adjustment of the distance between the chassis and the ground, wherein said current state of the second axle is a current set height of the height-adjustable connector of the second axle.

According to at least one exemplary embodiment, the method comprises limiting the propulsion torque provided by said at least one second electric machine:
to a lower value when said set current height is decreased, and
to a higher value when said current height is increased.

According to at least one exemplary embodiment, said current state of the second axle is a measure of how much lateral force that is generated by tyres of said second wheels of the second axle, or said current state of the second axle is a measure of how much lateral slip that is generated by tyres of said second wheels of the second axle.

According to at least one exemplary embodiment, the method comprises limiting the propulsion torque provided by said at least one second electric machine:
to a lower value when said generated lateral force or lateral slip is increased, and
to a higher value when said generated lateral force or lateral slip is decreased.

According to at least one exemplary embodiment, said vehicle is a vehicle according to the first aspect of the present disclosure, including any embodiment thereof.

According to a third aspect of the present disclosure, there is provided a computer program comprising program code means for performing the method according to the second aspect, including any embodiments thereof, when said program is run on a computer. The advantages of the computer program of the third aspect largely correspond to those of the other aspects, including any embodiments thereof.

According to a fourth aspect of the present disclosure, there is provided a computer readable medium carrying a computer program comprising program code means for performing the method according to the second aspect, including any embodiments thereof, when said program product is run on a computer. The advantages of the computer readable medium of the fourth aspect largely correspond to the advantages of the other aspects, including any embodiments thereof.

According to a fifth aspect of the present disclosure, there is provided a control unit for controlling the propulsion of a vehicle, the control unit being configured to perform the method according to the second aspect, including any embodiments thereof. The advantages of the control unit of the fifth aspect largely correspond to the advantages of the other aspects, including any embodiments thereof.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. Further features of, and advantages with, the present invention will become apparent when studying the appended claims and the following description. The skilled person realizes that different features of the present invention may be combined to create embodiments other than those described in the following, without departing from the scope of the present invention.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS OF THE INVENTION

Figure 1:
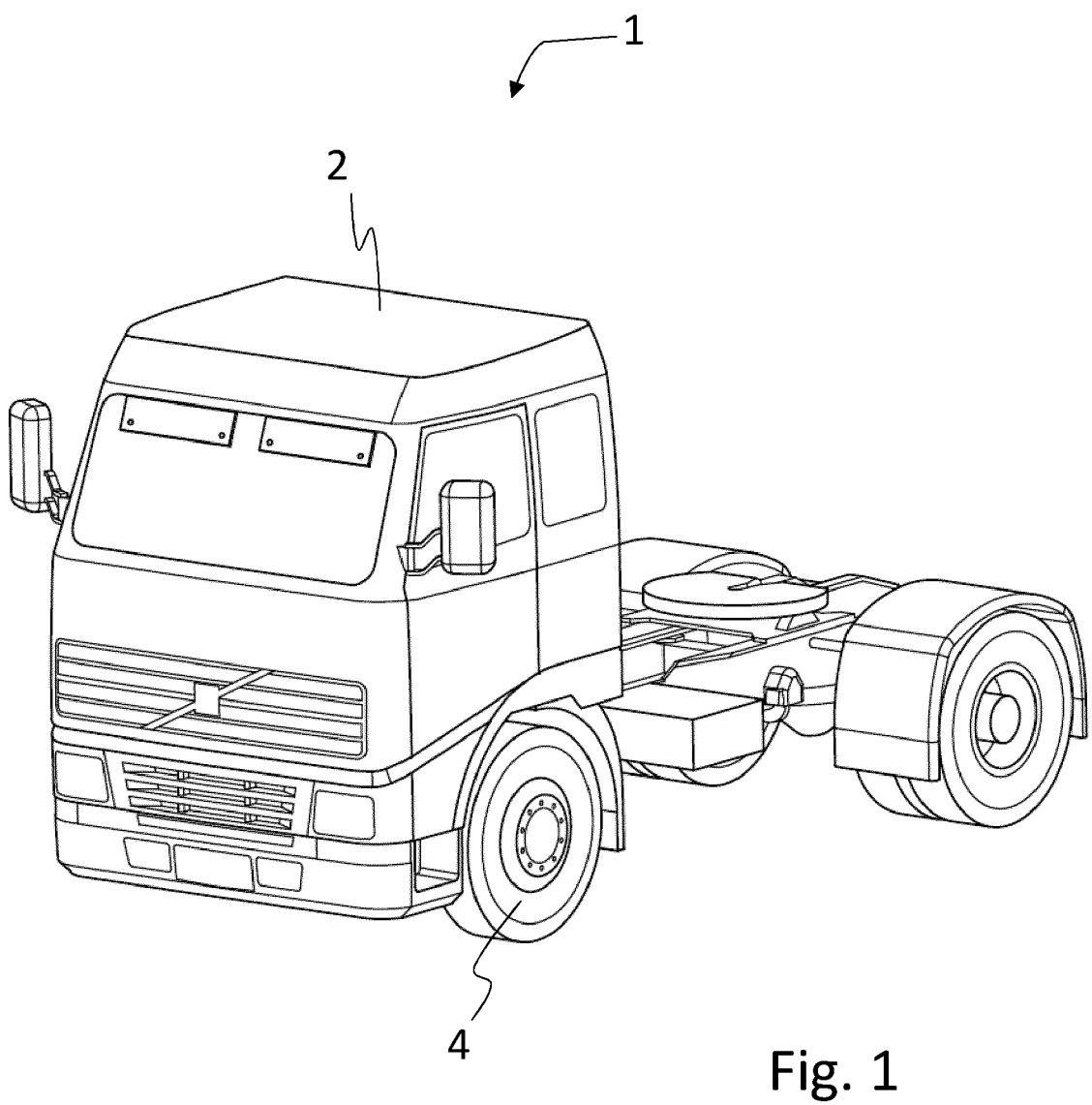
FIG. 1 illustrates a vehicle according to at least one exemplary embodiment of the invention.

The invention will now be described more fully hereinafter with reference to the accompanying drawings, in which certain aspects of the invention are shown. The invention may, however, be embodied in many different forms and should not be construed as limited to the embodiments and aspects set forth herein; rather, the embodiments are provided by way of example so that this disclosure will be thorough and complete, and will fully convey the scope of the invention to those skilled in the art. Accordingly, it is to be understood that the present invention is not limited to the embodiments described herein and illustrated in the drawings; rather, the skilled person will recognize that many changes and modifications may be made within the scope of the appended claims. Like reference numerals refer to like elements throughout the description.

FIG. 1 illustrates a vehicle 1 according to at least one exemplary embodiment of the invention. The exemplary illustration in FIG. 1 shows a tractor unit for towing a trailer unit (not shown), which together make up a semitrailer vehicle. However, the invention is applicable to other types of vehicles as well. For instance, the vehicle may be a different type of vehicle for cargo transport, such as a truck, or a truck with a dolly unit arranged to tow a trailer unit, etc. It should furthermore be understood that the inventive concept is not limited to heavy duty vehicles, but may also be implemented in other vehicles, such as cars.

The vehicle 1 may be driver-operated, wherein the driver operates the vehicle 1 from within a cabin 2. However, in some exemplary embodiments, the vehicle 1 may be autonomous.

The illustrated vehicle 1 is supported on wheels 4. Although the vehicle 1 in FIG. 1 only has two axles carrying wheels, the inventive concept is applicable to vehicles having more axles carrying wheels, such as in the above-mentioned different types of vehicles.

Each wheel 4, or each group of wheels, may be associated with a torque actuator in the form of an electric machine. In some exemplary embodiments, one or more of the electric machines may be a regenerative torque actuator which is able to slow down wheel rotational velocity upon request.

The electric machines are controlled by a control unit, which may control the torque applied to the wheels 4 by means of the electric machines. The electric machines and the control unit are not illustrated in FIG. 1, but will be discussed in more detail in connection with other figures. The electric machines may be provided on an axle level, i.e. one electric machine is used for providing torque to both left and right wheels of an axle, e.g. via an open differential. In other embodiments, the electric machines may be provided on a wheel level, i.e. one electric machine provides torque to an associated wheel 4. In some exemplary embodiments, the vehicle may have electric machines on both the axle and the wheel level. Furthermore, in some exemplary embodiments, an individual wheel 4 may be powered by more than one electric machines, such as two or three electric machines.

From the above it should be understood that there are a number of different conceivable configurations of electric machines, for which the general inventive concept may be implemented. In summary, there may be provided one or more electric machines for providing a propulsion force to an axle of the vehicle 1.

The control unit may be communicatively coupled to local control modules, such as axle modules or wheel end modules, which can activate/deactivate the electric machines. Such local control modules may also be operatively connected to other torque actuators such as friction brakes, for activating/deactivating such other torque actuators. Thus, the control unit may communicate with the local control modules and thereby provide instructions on controlling of the electric machines, and possibly other torque actuators. It should, however, be understood, that in some exemplary embodiments, the control unit may be in direct communication with the electric machines. Furthermore, it should be understood that the control unit may comprise a number of sub-units distributed across the vehicle 1, or it may be a single physical unit.

Figure 2:
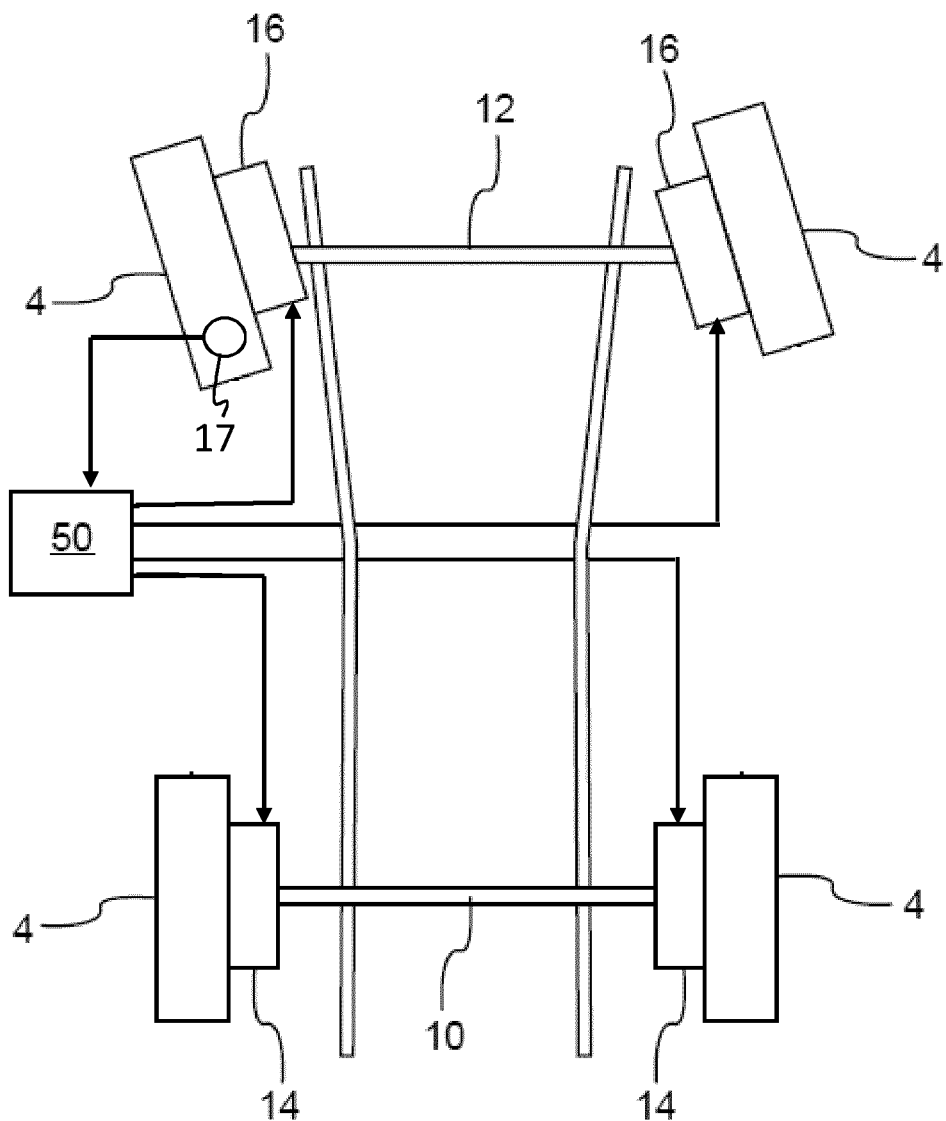
FIG. 2 illustrates very schematically parts of a vehicle according to at least one exemplary embodiment of the invention.

FIG. 2 illustrates very schematically parts of a vehicle according to at least one exemplary embodiment of the invention. The vehicle comprises a first axle 10, here illustrated as a non-steered rear axle, and a second axle 12, here illustrated as a steered front axle. It should, however, be understood that in other exemplary embodiments the first axle may be a front axle and the second axle may be a steered rear axle.

Each one of the first axle 10 and the second axle 12 is provided with a pair of wheels 4. Thus, the first axle 10 is provided with a pair of first wheels 4 and the second axle 12 is provided with a pair of second wheels 4. Since the second axle 12 is a steered axle, said pair of second wheels 4 on the second axle 12 may be turned. Although only one left wheel 4 and one right wheel 4 are illustrated for each axle 10, 12, in other exemplary embodiments, it is conceivable to have more wheels, such as two rear left wheels and two rear right wheels on the first axle 10.

The vehicle also comprises at least one first electric machine 14 for providing propulsion torque to the first axle 10. In the illustrated example, there are provided two first electric machines 14, one for each wheel 4. Similarly, the vehicle comprises at least one second electric machine 16 for providing propulsion torque to the second axle 12. In the illustrated example, there are provided two second electric machines 16, one for each wheel 4.

The vehicle also comprises a control unit 50 which is configured to control the electric machines 14, 16.

Furthermore, the control unit 50 is configured to limit the propulsion torque provided by said at least one second electric machine 16 in dependence of a current state of the second axle 12, including the components it is provided with.

The current state may, for instance, be a current steering angle of at least one of said second wheels 4 of the second axle 12, a current set height of a height-adjustable connector of the second axle 1, and/or a measure of how much lateral force or lateral slip that is generated by tyres of said second wheels 4 of the s second axle 12. In the following disclosure, focus will be on the first example, i.e. the steering angle.

Thus, the control unit 50 may be configured to limit the propulsion torque provided by said at least one second electric machine 16 in dependence of a current steering angle of at least one of said second wheels 4, i.e. one of the wheels 4 at the second axle 12. The control unit may suitably receive input signals representative of the current steering angles, such as input signals from angle sensors 17 (only one illustrated in FIG. 2, however, it should be understood that the right wheel may of course also have an angle sensor). As previously explained in this disclosure, other means for directly or indirectly measuring the steering angles may additionally or alternatively be provided, such as measuring parameters related to a power steering assist arrangement.

When the current steering angle is increased the control unit 50 may suitably lower the maximum propulsion torque that the second electric machine(s) 16 are allowed to provide to the second axle 12. When the current steering angle is decreased, the control unit 50 may instead increase the maximum allowable propulsion torque for the second electric machine(s) 16. By limiting the maximum allowable propulsion torque in dependence of the current steering angle, vehicle components such as universal joints may be spared from adverse effects, and their lifetime can be extended. The control unit 50 may suitably be configured to increase the torque split ratio between the first electric machines 14 on the one hand and the second electric machines 16 on the other hand when said current steering angle increases. Thus, the control unit 50 may allocate a larger proportion of the total torque request to the first electric machines 14 when said current steering angle is increased. Conversely, when the steering angle is decreased the control unit 50 may decide to provide a somewhat smaller proportion of the total torque request to the first electric machines 14, as long as the second electric machines 16 can be kept within the torque limitation determined by the control unit 50.

The first axle 10 may have different properties compared to the second axle 12. Furthermore, the first electric machines 14 may have different properties compared to the second electric machines 16. The control unit 50 may take into account the different properties in its control strategy.

The control unit 50 may be configured to identify which one of the first electric machines 14 and the second electric machines 16 that have the highest electric efficiency for operating the vehicle at a current or a desired vehicle operating condition. The control unit 50 may, based on the identification, control the identified electric machines to provide a propulsion torque to its associated axle. For instance, the efficiency map for the first electric machines 14 may be such that they have relatively high efficiency at low speeds and high torques, while the efficiency map for the second electric machines 16 may be such that they have relatively high efficiency at high speeds and low torques. In such case, the control unit 50 may, for instance, identify the first electric machines 14 at an uphill start situation, but identify the second electric machines 16 when the vehicle is at cruising speed on a flat road.

When the total torque or the total power that is needed for needed for maintaining a current vehicle operating condition, or for reaching a desired vehicle operating condition, is not achieved by solely controlling the identified electric machines, then the control unit 50 may also control the other one of the first and second electric machines 14, 16 to provide torque to its associated axle 10, 12 so that said total torque or total power is obtained. Thus, the non-identified electric machines may be used to "fill up" the torque or power need. For instance, if the start is in a very steep uphill slope, and the control unit 50 notes that operating the first electric machines 14 is not enough for attaining the desired torque/power, then the control unit 50 may also control the second electric machines 16 to provide additional torque/power. However, if the uphill start also involves turning the vehicle, the control unit will depending on the steering angle limit the maximum allowable torque(s) that the second electric machine(s) 16 may provide to the second axle 12.

Although not illustrated in the schematic view, each electric machine 14, 16 may suitably be operatively connected to a respective wheel end module. In such case, the control unit 50 may send requests to each wheel end module which in turn operates its associated electric machines 14, 16. The wheel end modules may also operate the activation and deactivation of other torque actuators, such as friction brakes. Instead of wheel end modules, there may be provided axle module which may be operatively connected to all torque actuators on an axle. In such case, the control unit 50 may send requests to the axle module.

As mentioned above, the first axle 10 may have different properties compared to the second axle 12. For instance, the first axle 10 may have a higher gear ratio than the second axle 12. As an example, the first axle 10 may have a gear ratio of 22:1 and the second axle 12 may have a gear ratio of 10:1. As understood from previous discussions, the first axle 10 may suitably be configured as a startability axle to be powered when initially accelerating the vehicle, and the second axle 12 may be configured as a cruise axle to be powered when the vehicle is cruising. As already mentioned, one of said different properties of the first axle 10 compared to the second axle 12 may be that the second axle 12 is a steered axle and the first axle 10 is a non-steered axle. Another possible difference in property is that the first axle 10 may be declutchable, while the second axle 12 is not declutchable. Depending on the type of electric machines 14 propelling the first axle 10, it may be desirable to declutch the first axle 10 to reduce the risk of energy losses (due to unused electric machine resistance) when the vehicle is driving in a cruise mode.

As mentioned above, the first electric machines 14 may have different properties compared to the second electric machines 16. For instance, the first electric machines 14 may have a different efficiency map than the second electric machines 16. The efficiency maps may suitably be adapted to different vehicle operating conditions, such as start mode, acceleration mode and cruise mode. Suitably, the maximum electric efficiency (i.e. the maximum efficiency in the efficiency map) of the second electric machines 16 is higher than the maximum electric efficiency of the first electric machines 14, such as 95-96% compared to 92%-93%. One of said different properties of the first electric machines 14 compared to the second electric machines 16 may be that the first electric machines 14 are configured for handling larger transient torques than the second electric machines 16. The second electric machines 16 may suitably be dimensioned and configured for powering the second axle 12 when the vehicle is cruising, such as at a predefined cruising speed range and a predefined slope. The second electric machines 16 may be configured for powering the second axle 12 at continuous torque, substantially without any transients. The first electric machines 14 may be configured for powering the first axle 10 at hill start, such as providing a transient maximum torque for a relatively short time length, for instance 30 seconds at a slope of 15%. The first electric machines 14 may suitably be induction motors, in which case declutching capability may be omitted. However, the first electric machines 14 may instead be permanent magnet motors, in which case they may suitably be declutchable from the first axle 10 to reduce the risk of energy losses due to unused electric machine resistance. The second electric machines 16 may suitably be permanent magnet motors.

As already explained previously in this disclosure, under some vehicle operating conditions, it may be more efficient to only control one of the two first electric machines 14. For instance, when the total torque or the total power needed for maintaining a current operating condition, or for reaching a desired vehicle operating condition, is below a predefined threshold value, then the control unit 50 may control only one of said two first electric machines 14 to provide a torque to the first axle 10, while the other one of said two first electric machines 14 is controlled not to provide any torque to the first axle 10. Similarly, the control unit 50 may determine to control only one of said two second electric machines 16 to provide a torque to the second axle 12, while the other one of said two second electric machines 16 is controlled not to provide any torque to the second axle 12.

As already mentioned, instead of having two first electric machines 14 and two second electric machines 16, which act on a wheel level, as illustrated in the FIG. 2, in some exemplary embodiments there may be an electric machine (or more electric machines) which act on an axial level. In such axial level embodiments, the control unit may limit the torque of the second electric machine(s) based on the current steering angle of one or both wheels of the second axle. In FIG. 2, however, the control unit 50 is suitably configured to limit the propulsion torque provided by the second electric machine 16 at the left end of the second axle 12 in dependence of the current steering angle of the second wheel 4 at the left end of the second axle 12. Similarly, the limiting of the second electric machine 16 on the right hand side may be based on the current steering angle of the wheel 4 at the right end of the second axle 12.

Figure 3:
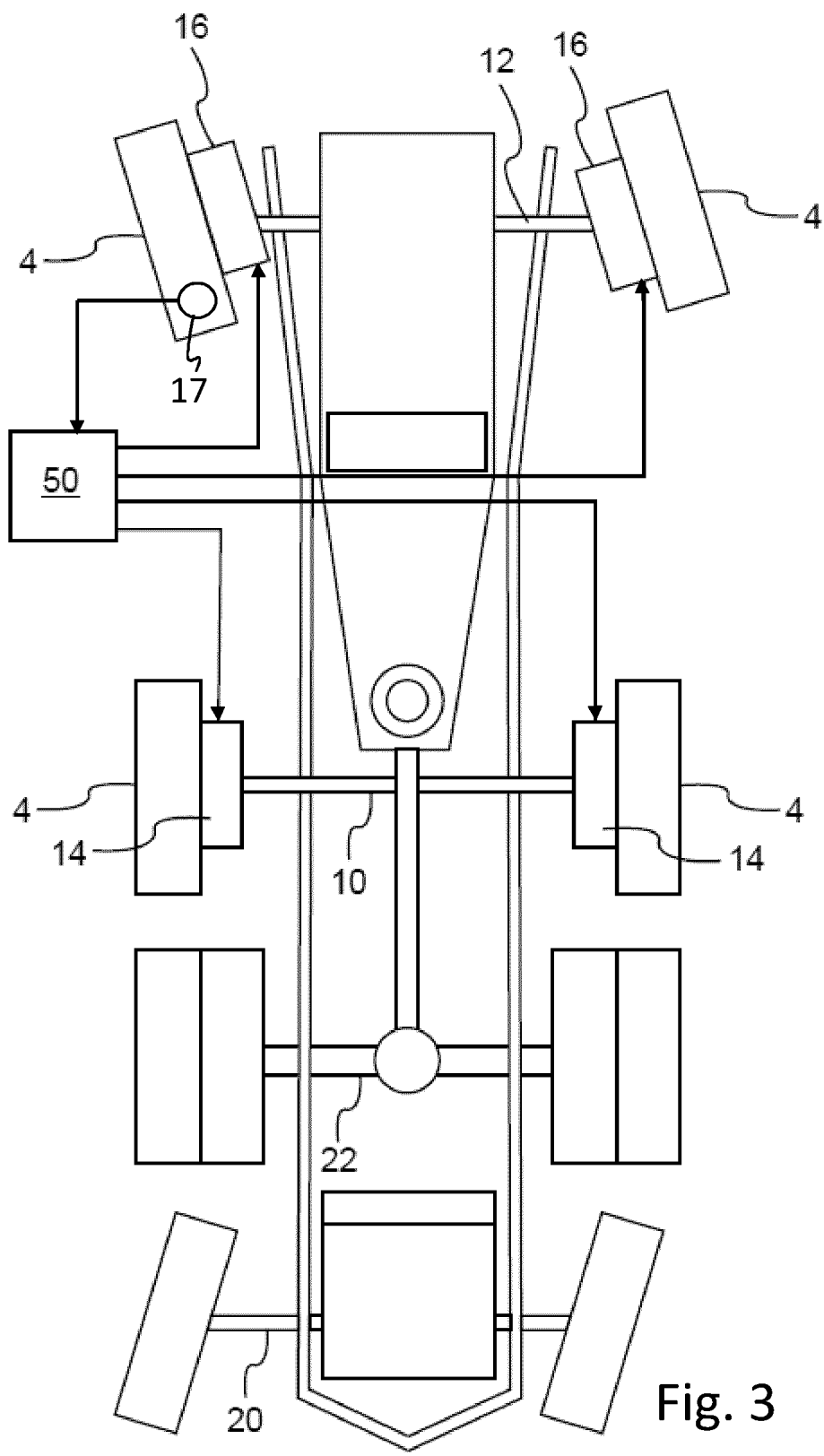
FIG. 3 illustrates very schematically parts of a vehicle according to at least one other exemplary embodiment of the invention.

FIG. 3 illustrates very schematically parts of a vehicle according to at least one other exemplary embodiment of the invention. In addition to the first axle 10 and the second axle 12, the vehicle is provided with two additional wheel axles 20, 22. In this exemplary embodiment the first axle 10 may be a lift axle which is liftable from the ground. The lift axle (first axle 10) is here illustrated as a pusher axle, although a tag axle would also be conceivable. The first axle 10 is suitably a startability axle which is used when starting and accelerating the vehicle, but which may be lifted from the ground when the vehicle reaches the cruise mode. In the cruise mode it may be enough to provide propulsion force to the second axle 12. Similarly, to FIG. 2, the exemplary embodiment of FIG. 3 includes first electric machines 14 operatively connected to the first axle 10, and second electric machines 16 operatively connected to the second axle 12, and a control unit 50 which controls the electric machines 14, 16 (either directly or via wheel end modules/axle modules).

Figure 4:
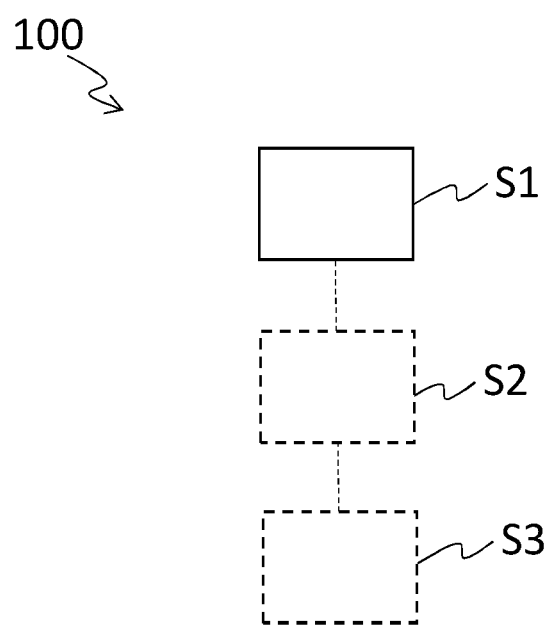
FIG. 4 schematically illustrates a method according to an exemplary embodiment of the invention.

FIG. 4 schematically illustrates a method 100 according to an exemplary embodiment of the invention. More specifically, there is illustrated a method 100 of controlling the propulsion of a vehicle, wherein the vehicle comprises:
  a first axle provided with at least a pair of first wheels,
  a second axle provided with at least a pair of second wheels, wherein the second axle is a steered axle allowing said second wheels to be turned,
  at least one first electric machine for providing propulsion torque to the first axle,
  at least one second electric machine for providing propulsion torque to the second axle, the method 100 comprising:
  in a step S1, limiting the propulsion torque provided by said at least one second electric machine in dependence of a current state of the second axle.

In some exemplary embodiments, in step 1, the propulsion torque provided by said at least one second electric machine is limited in dependence of a current steering angle of at least one wheel of the second axle. In some exemplary embodiments, said step S1, may comprise limiting the propulsion torque provided by said at least one second electric machine:
  to a lower value when said current steering angle increases, and
  to a higher value when said current steering angle decreases.

The method 100 may in some exemplary embodiments comprise, in an optional step S2, controlling the torque split ratio between said at least one first electric machine and said at least one second electric machine to increase when said current steering angle increases.

When said at least one second electric machine comprises two second electric machines, one at a left end of the second axle and one at a right end of the second axle, the method may comprise, in an optional step S3, limiting the propulsion torque provided by the second electric machines at the left end in dependence of the current steering angle of the second wheel at the left end of the second axle, and limiting the propulsion torque provided by the second electric machine at the right end in dependence of the current steering angle of the second wheel at the right end of the second axle.

Figure 5:
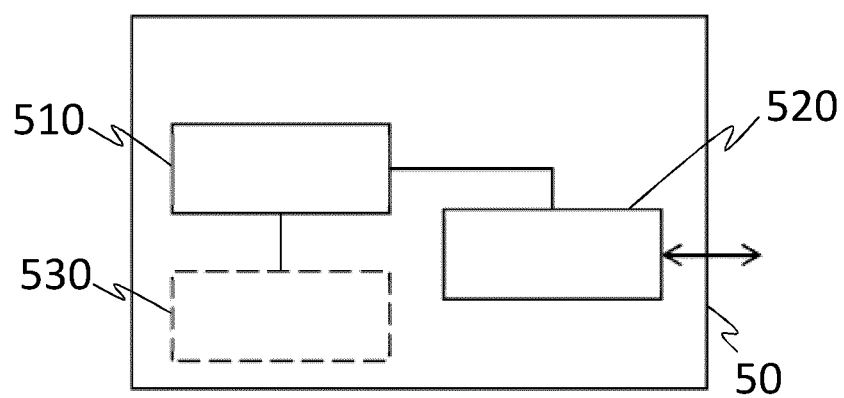
FIG. 5 schematically illustrates a control unit according to at least one exemplary embodiment of the invention.

FIG. 5 schematically illustrates a control unit 50 according to at least one exemplary embodiment of the invention. In particular, FIG. 5 illustrates, in terms of a number of functional units, the components of a control unit 50 according to exemplary embodiments of the discussions herein. The control unit 50 may be comprised in a vehicle, such as illustrated schematically in FIGS. 2 and 3. Processing circuitry 510 may be provided using any combination of one or more of a suitable central processing unit CPU, multiprocessor, microcontroller, digital signal processor DSP, etc., capable of executing software instructions stored in a computer program product, e.g. in the form of a storage medium 530. The processing circuitry 510 may further be provided as at least one application specific integrated circuit ASIC, or field programmable gate array FPGA.

Particularly, the processing circuitry 510 is configured to cause the control unit 50 to perform a set of operations, or steps, such as the method discussed in connection to FIG. 4. For example, the storage medium 530 may store the set of operations, and the processing circuitry 510 may be configured to retrieve the set of operations from the storage medium 530 to cause the control unit 50 to perform the set of operations. The set of operations may be provided as a set of executable instructions. Thus, the processing circuitry 510 is thereby arranged to execute exemplary methods as herein disclosed.

The storage medium 530 may also comprise persistent storage, which, for example may be any single one or combination of magnetic memory, optical memory, solid state memory or even remotely mounted memory.

The control unit 50 may further comprise an interface 520 for communications with at least one external device such as the electric machines, a battery module, sensors (e.g. angle sensor 17 in FIGS. 2 and 3), etc. . . . As such, the interface 520 may comprise one or more transmitters and receivers, comprising analogue and digital components and a suitable number of ports for wireline or wireless communication.

The processing circuitry 510 controls the general operation of the control unit 50, e.g. by sending data and control signals to the interface 520 and the storage medium 530, by receiving data and reports from the interface 520, and by retrieving data and instructions form the storage medium 530. Other components, as well as the related functionality, of the control unit 50 are omitted in order not to obscure the concepts presented herein.

Thus, with reference also to the previously discussed figures, FIG. 5 shows an exemplary control unit 50 for controlling the propulsion of a vehicle, the control unit 50 being configured to perform the steps of the method of FIG. 4, including any embodiments thereof.

Figure 6:
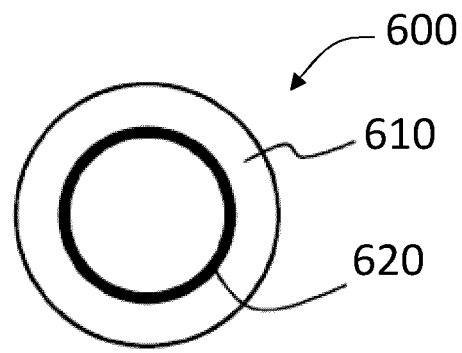
FIG. 6 schematically illustrates a computer program product according to at least one exemplary embodiment of the invention.

FIG. 6 schematically illustrates a computer program product 600 according to at least one exemplary embodiment of the invention. More specifically, FIG. 6 illustrates a computer readable medium 610 carrying a computer program comprising program code means 620 for performing the methods exemplified in FIG. 4, when said program product is run on a computer. The computer readable medium 610 and the program code means 620 may together form the computer program product 600.

The invention claimed is:

1. A vehicle, comprising:
a first axle provided with at least a pair of first wheels,
a second axle provided with at least a pair of second wheels, wherein the second axle is a steered axle allowing said second wheels to be turned,
at least one first electric machine for providing propulsion torque to the first axle,
at least one second electric machine for providing propulsion torque to the second axle, and
a control unit configured to control the first and second electric machines, wherein the control unit is configured to limit the propulsion torque provided by said at least one second electric machine in dependence of a current state of the second axle,
wherein the vehicle further comprises a chassis, wherein the second axle is provided with a height-adjustable connector operatively connecting the chassis to the second axle for enabling adjustment of the distance between the chassis and the ground, wherein said current state of the second axle is a current set height of the height-adjustable connector of the second axle,
wherein the control unit is configured to limit the propulsion torque provided by said at least one second electric machine:
to a lower value when said set current height is decreased, and
to a higher value when said current height is increased.

2. The vehicle according to claim 1, wherein said current state is a current steering angle of at least one of said second wheels of the second axle.

3. The vehicle according to claim 2, wherein the control unit is configured to limit the propulsion torque provided by said at least one second electric machine:
to a lower value when said current steering angle increases, and
to a higher value when said current steering angle decreases.

4. The vehicle according to claim 2, wherein the control unit is configured to increase the torque split ratio between said at least one first electric machine and said at least one second electric machine when said current steering angle increases.

5. The vehicle according to claim 2, wherein said at least one second electric machine comprises two second electric machines, one at a left end of the second axle and one at a right end of the second axle, wherein the control unit is configured to limit the propulsion torque provided by the second electric machines at the left end in dependence of the current steering angle of the second wheel at the left end of the second axle, and to limit the propulsion torque provided by the second electric machine at the right end in dependence of the current steering angle of the second wheel at the right end of the second axle.

6. The vehicle according to claim 1, wherein said current state of the second axle is a measure of how much lateral force that is generated by tyres of said second wheels of the second axle, or wherein said current state of the second axle is a measure of how much lateral slip is generated by the tyres of said second wheels of the second axle.

7. The vehicle according to claim 6, wherein the control unit is configured to limit the propulsion torque provided by said at least one second electric machine:
to a lower value when said generated lateral force or lateral slip is increased, and
to a higher value when said generated lateral force or lateral slip is decreased.

8. The vehicle according to claim 1, wherein the first axle is located rearwardly of the second axle as seen in the normal driving direction of the vehicle.

9. The vehicle according to claim 1, wherein the first axle is configured as a low speed range axle, and wherein the second axle is configured as a high speed range axle.

10. The vehicle according to claim 1, wherein the first axle is configured as a startability axle to be powered when initially accelerating the vehicle, and the second axle is configured as a cruise axle to be powered when the vehicle is cruising.

11. The vehicle according to claim 1, wherein the first axle has a higher gear ratio than the second axle.

12. The vehicle according to claim 1, wherein the first axle is declutchable, and the second axle is not declutchable.

13. A method of controlling the propulsion of a vehicle, wherein the vehicle comprises:
a first axle provided with at least a pair of first wheels,
a second axle provided with at least a pair of second wheels, wherein the second axle is a steered axle allowing said second wheels to be turned,
at least one first electric machine for providing propulsion torque to the first axle,
at least one second electric machine for providing propulsion torque to the second axle, the method comprising:
limiting the propulsion torque provided by said at least one second electric machine in dependence of a current state of the second axle
wherein the vehicle further comprises a chassis, wherein the second axle is provided with a height adjustable connector operatively connecting the chassis to the second axle for enabling adjustment of the distance between the chassis and the ground, wherein said current state of the second axle is a current set height of the height-adjustable connector of the second axle,
the method further comprising limiting the propulsion torque provided by said at least one second electric machine:
to a lower value when said set current height is decreased, and
to a higher value when said current height is increased.

14. The method according to claim 13, wherein said current state is a current steering angle of at least one of said second wheels of the second axle.

15. The method according to claim 14, comprising limiting the propulsion torque provided by said at least one second electric machine:
to a lower value when said current steering angle increases, and
to a higher value when said current steering angle decreases.

16. The method according to claim 14, comprising controlling the torque split ratio between said at least one first electric machine and said at least one second electric machine to increase when said current steering angle increases.

17. The method according to claim 14, wherein said at least one second electric machine comprises two second electric machines, one at a left end of the second axle and one at a right end of the second axle, the method comprising:
limiting the propulsion torque provided by the second electric machines at the left end in dependence of the current steering angle of the second wheel at the left end of the second axle, and
limiting the propulsion torque provided by the second electric machine at the right end in dependence of the current steering angle of the second wheel at the right end of the second axle.

18. The method according to claim 13, wherein said current state of the second axle is a measure of how much lateral force that is generated by tyres of said second wheels of the second axle, or wherein said current state of the second axle is a measure of how much lateral slip that is generated by tyres of said second wheels of the second axle.

19. The method according to claim 18, comprising limiting the propulsion torque provided by said at least one second electric machine:
to a lower value when said generated lateral force or lateral slip is increased, and
to a higher value when said generated lateral force or lateral slip is decreased.

20. A non-transitory computer readable medium carrying a computer program comprising program code for controlling the propulsion of a vehicle, wherein the vehicle comprises:
a first axle provided with at least a pair of first wheels,
a second axle provided with at least a pair of second wheels, wherein the second axle is a steered axle allowing said second wheels to be turned,
at least one first electric machine for providing propulsion torque to the first axle,
at least one second electric machine for providing propulsion torque to the second axle,
a computer performing the following when said program code is run on the computer:
limiting the propulsion torque provided by said at least one second electric machine in dependence of a current state of the second axle
wherein the vehicle further comprises a chassis, wherein the second axle is provided with a height adjustable connector operatively connecting the chassis to the second axle for enabling adjustment of the distance between the chassis and the ground, wherein said current state of the second axle is a current set height of the height-adjustable connector of the second axle,
limiting the propulsion torque provided by said at least one second electric machine:
to a lower value when said set current height is decreased, and
to a higher value when said current height is increased.

21. A control unit for controlling the propulsion of a vehicle, wherein the vehicle comprises:
a first axle provided with at least a pair of first wheels,
a second axle provided with at least a pair of second wheels, wherein the second axle is a steered axle allowing said second wheels to be turned,
at least one first electric machine for providing propulsion torque to the first axle,
at least one second electric machine for providing propulsion torque to the second axle,
the control unit being configured to perform;

limiting the propulsion torque provided by said at least one second electric machine in dependence of a current state of the second axle,
   wherein the vehicle further comprises a chassis, wherein the second axle is provided with a height adjustable connector operatively connecting the chassis to the second axle for enabling adjustment of the distance between the chassis and the ground, wherein said current state of the second axle is a current set height of the height-adjustable connector of the second axle,
limiting the propulsion torque provided by said at least one second electric machine:
   to a lower value when said set current height is decreased, and
   to a higher value when said current height is increased.

* * * * *